United States Patent [19]
Chen

[11] Patent Number: 5,974,304
[45] Date of Patent: Oct. 26, 1999

[54] SMALL RADIO TRANSMITTER RECEIVER SYSTEM

[76] Inventor: Jinsaun Chen, 2F1., No. 8 & 10, Lane 337, Yung Ho Road, Chung Ho City, Taipei Hsien, Taiwan

[21] Appl. No.: 08/928,626

[22] Filed: Sep. 12, 1997

[51] Int. Cl.⁶ .............................. H04B 1/38; H04B 1/034
[52] U.S. Cl. .............................. 455/90; 455/95; 455/351; 455/575
[58] Field of Search .............................. 455/90, 95, 550, 455/575, 128, 347, 349, 350, 351; 379/428, 441, 442, 443; 381/309, 311; D14/137, 155, 188

[56] References Cited

U.S. PATENT DOCUMENTS

| | | |
|---|---|---|
| 4,845,751 | 7/1989 | Schwab .................................. 455/352 |
| 5,551,065 | 8/1996 | Honore .................................... 455/575 |
| 5,771,441 | 4/1996 | Altstatt .................................... 455/95 |
| 5,845,197 | 11/1995 | Hada et al. .............................. 455/90 |

*Primary Examiner*—Dwayne D. Bost
*Assistant Examiner*—Quochien B. Vuong
*Attorney, Agent, or Firm*—Daonald C. Casey, Esq.

[57] ABSTRACT

A small radio transmitter receiver system including a transmitter equipped with a concealed transmitting antenna and a receiver equipped with a concealed receiving antenna, the system using a 1.5V–3V battery to provide the necessary working voltage and providing at least two channels for selection, the transmitter being arranged in movable or fixed type as desired, the transmitting frequency of the transmitter being set within 35 MHz to 2.5 GHz for FM stereo or mono audio radio signal transmission as desired.

1 Claim, 8 Drawing Sheets

SMALL RADIO TRANSMITTER RECEIVER SYSTEM

BACKGROUND OF THE INVENTION

The present invention relates to a radio transmitter receiver system, and more particularly to a small radio transmitter receiver system which uses concealed transmitting antenna and concealed receiving antenna for transmitting and receiving radio signal, and which provides at least two channels for selection.

When listening to a radio or a CD player, a headphone may be used to prevent an interference with others. However, a headphone can only be used within a limited distance from the sound source because of the limitation of the length of its cable. There are known various radio transmitter receiver systems designed for use with an audio system. However, these radio transmitter receiver systems are commonly heavy, and not convenient for use outdoors. Because these systems use a fixed channel, when two or more persons use similar systems at a same place, signal interference will occur. Further, because the transmitting antenna of these systems must be exposed to the outside when in use, it is not practical to use these system with a walkman or portable CD player.

SUMMARY OF THE INVENTION

According to one aspect of the present invention, the small radio transmitter receiver system is comprised of a transmitter equipped with a concealed transmitting antenna and having a size about 53 mm×29 mm×32 mm, and a receiver equipped with a concealed receiving antenna. According to another aspect of the present invention, the system uses a 1.5V–3V battery to provide the necessary working voltage. According to still another aspect of the present invention, the system provides at least two channels for selection. According to still another aspect of the present invention, the transmitter can be arranged in movable or fixed type as desired. According to still another aspect of the present invention, the transmitting frequency of the transmitter is set within 35 MHz to 2.5 GHz for FM stereo or mono audio radio signal transmission as desired.

DETAILED DESCRIPTION OF THE PREFERRED EMBODIMENT

Figure 1A:
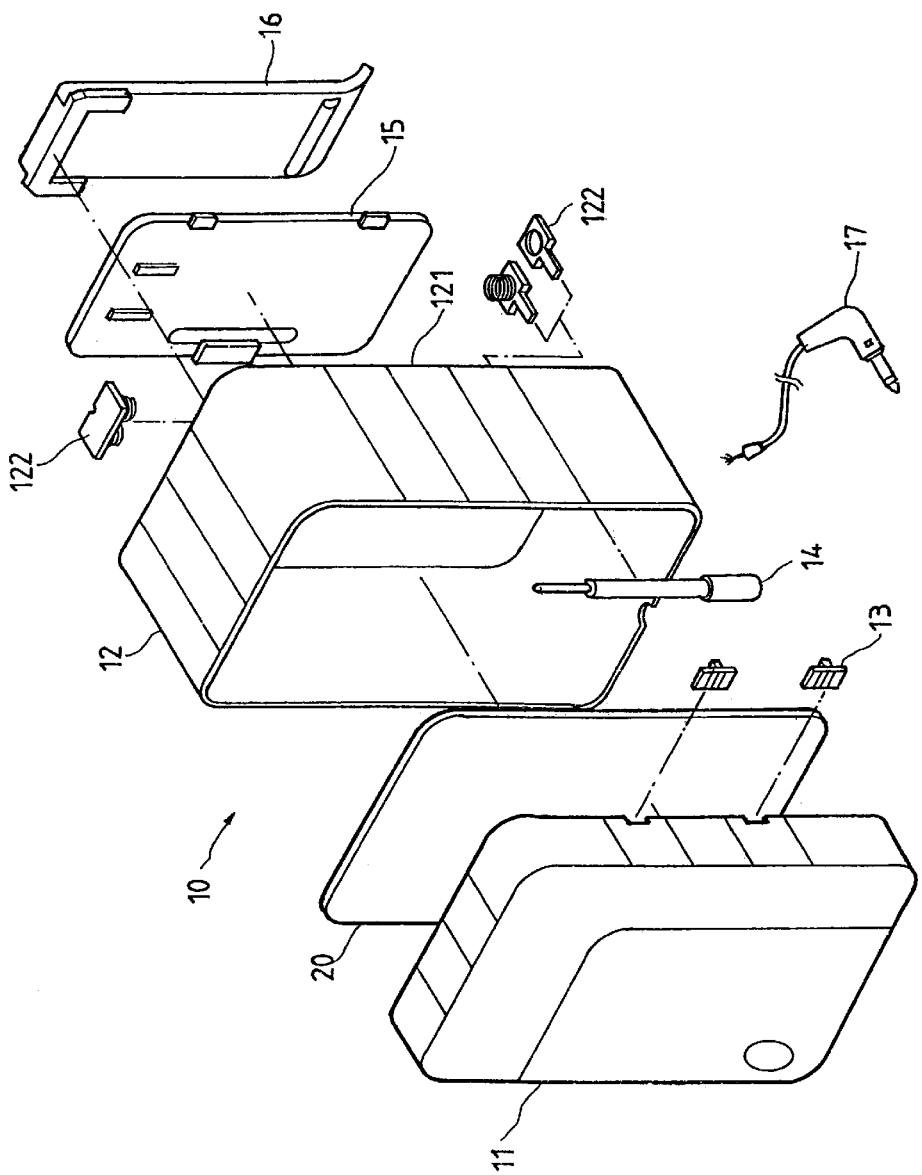
FIG. 1A is an exploded view of a transmitter according to the present invention.
Figure 1B:
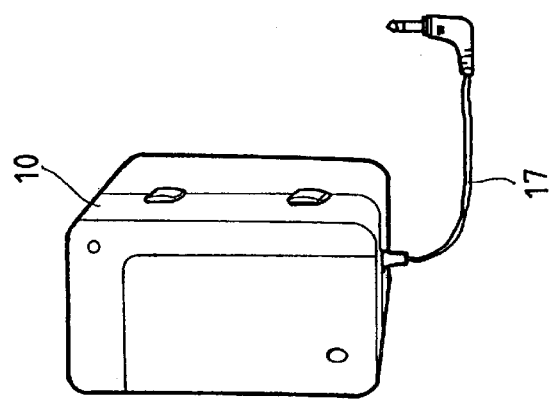
FIG. 1B is an elevational view of the transmitter shown in FIG. 1.

Referring to FIGS. 1A and 1B, a transmitter 10 is shown having a size of 53 mm×29 mm×32 mm. The transmitter 10 comprises an upper cover shell 11 and a bottom cover shell 12 fastened together, a printed circuit board 20 mounted within the upper cover shell 11 and the bottom cover shell 12, a plurality of switches 13 mounted on one side of the upper cover shell 11 and connected to the printed circuit board 20 for switching between at least two channels, a concealed transmitting antenna 14 mounted inside the upper cover shell 11 and the bottom cover shell 12 and connected to the printed circuit board 20 for transmitting radio signal, a battery chamber 121 disposed at a back side of the bottom cover shell 12, a plurality of battery terminal connectors 122 mounted inside the battery chamber 121 at its two opposite ends and respectively connected to the printed circuit board 20, a battery lid 15 covered on the battery chamber 121, a clip 16 fastened to the bottom cover shell 12 on the outside for fastening, and a 3.5Ø signal line 17 connected to the printed circuit board 20 and extended out of a bottom side of the bottom cover shell 12.

Figure 3:
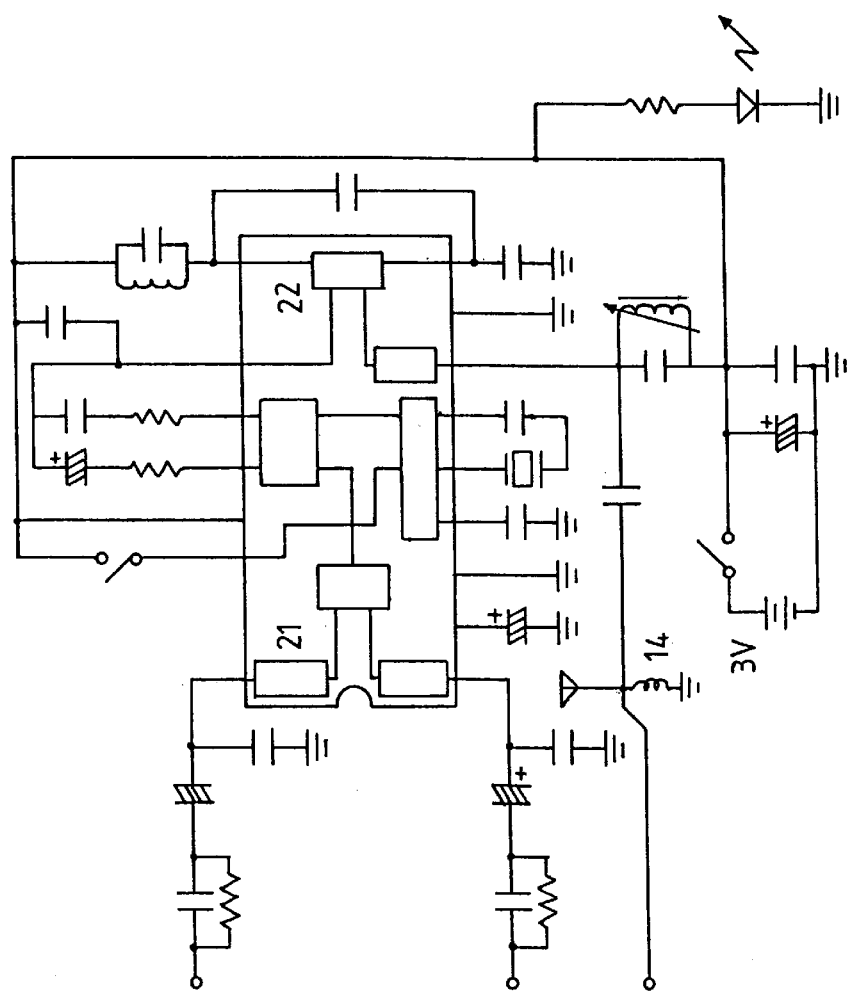
FIG. 3 is a circuit diagram of the transmitter according to the present invention.
Figure 6:
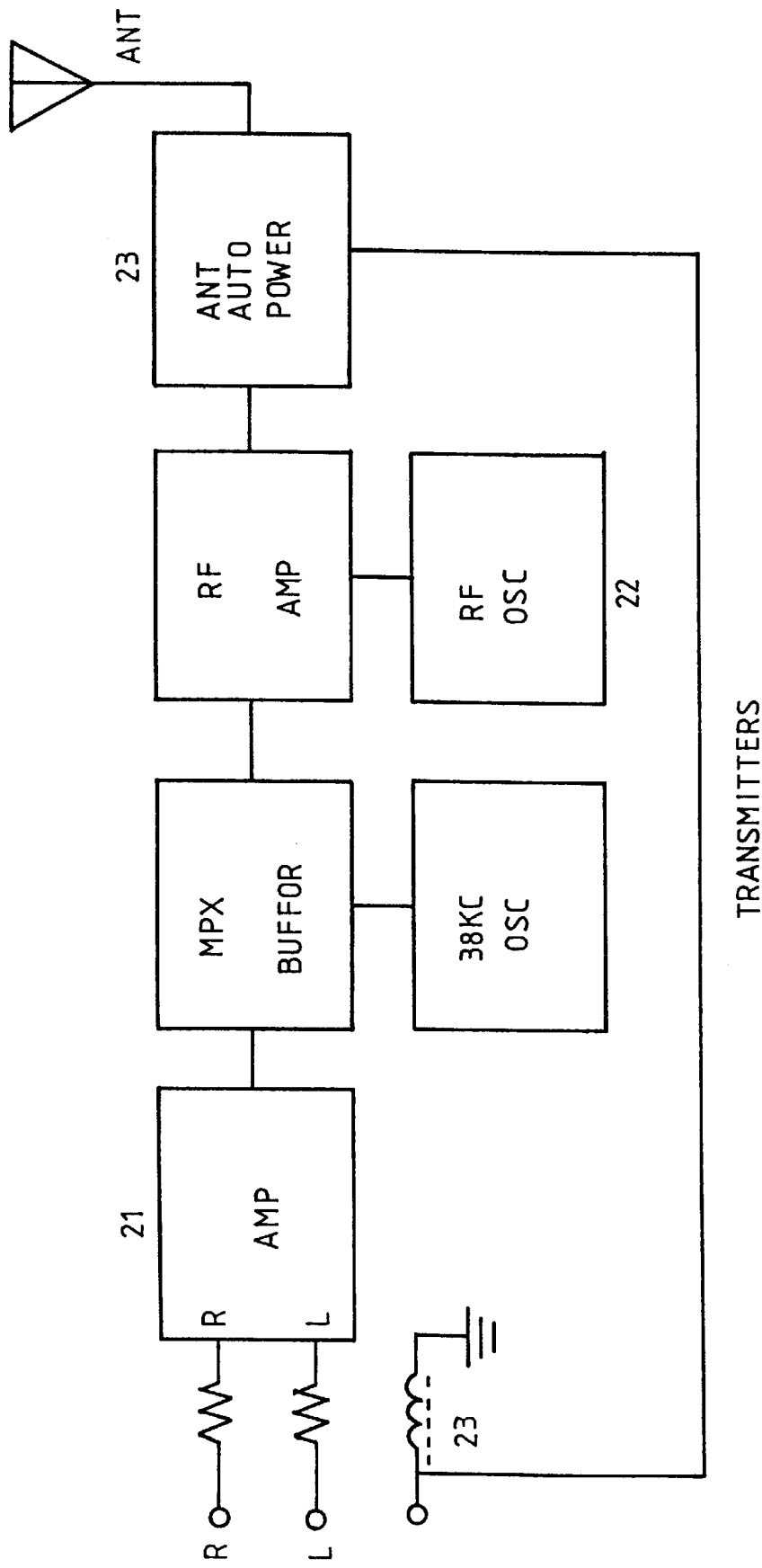
FIG. 6 is a block diagram of the printed circuit board of the transmitter according to the present invention.

Referring to FIGS. 3 and 6, the printed circuit board 20 comprises a single-chip signal processing circuit which is comprised of an input amplifier 21, a MPX (multiplex) buffer, a 38KC oscillator, a radio frequency oscillator 22, a radio frequency amplifier, an antenna auto power circuit 23. The output end of the signal processing circuit is connected to the antenna auto power circuit 23 and the induction antenna 14. Output signal from the mainframe of the audio equipment is transmitted to the input amplifier 21 is processed by the signal processing circuit and then sent to the antenna 14 through the antenna auto power circuit 23.

Figure 2B:
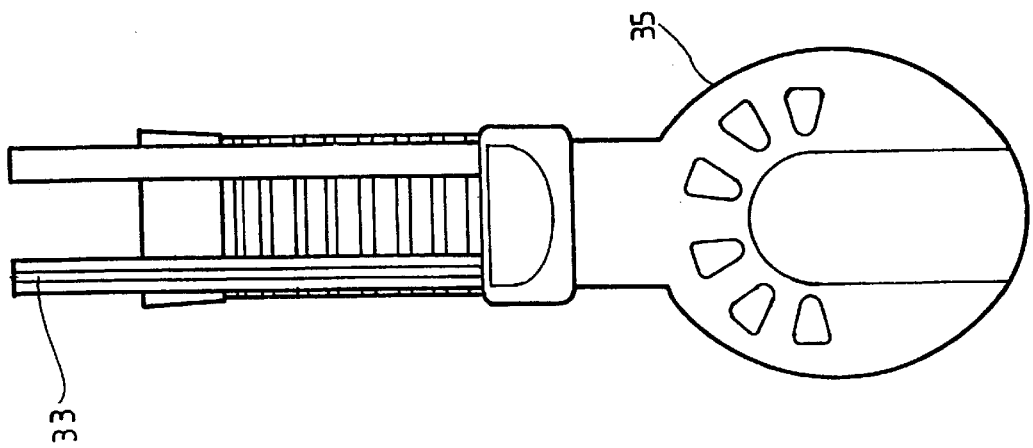
FIG. 2B is a front view of the receiver shown in FIG. 2A.
Figure 2A:
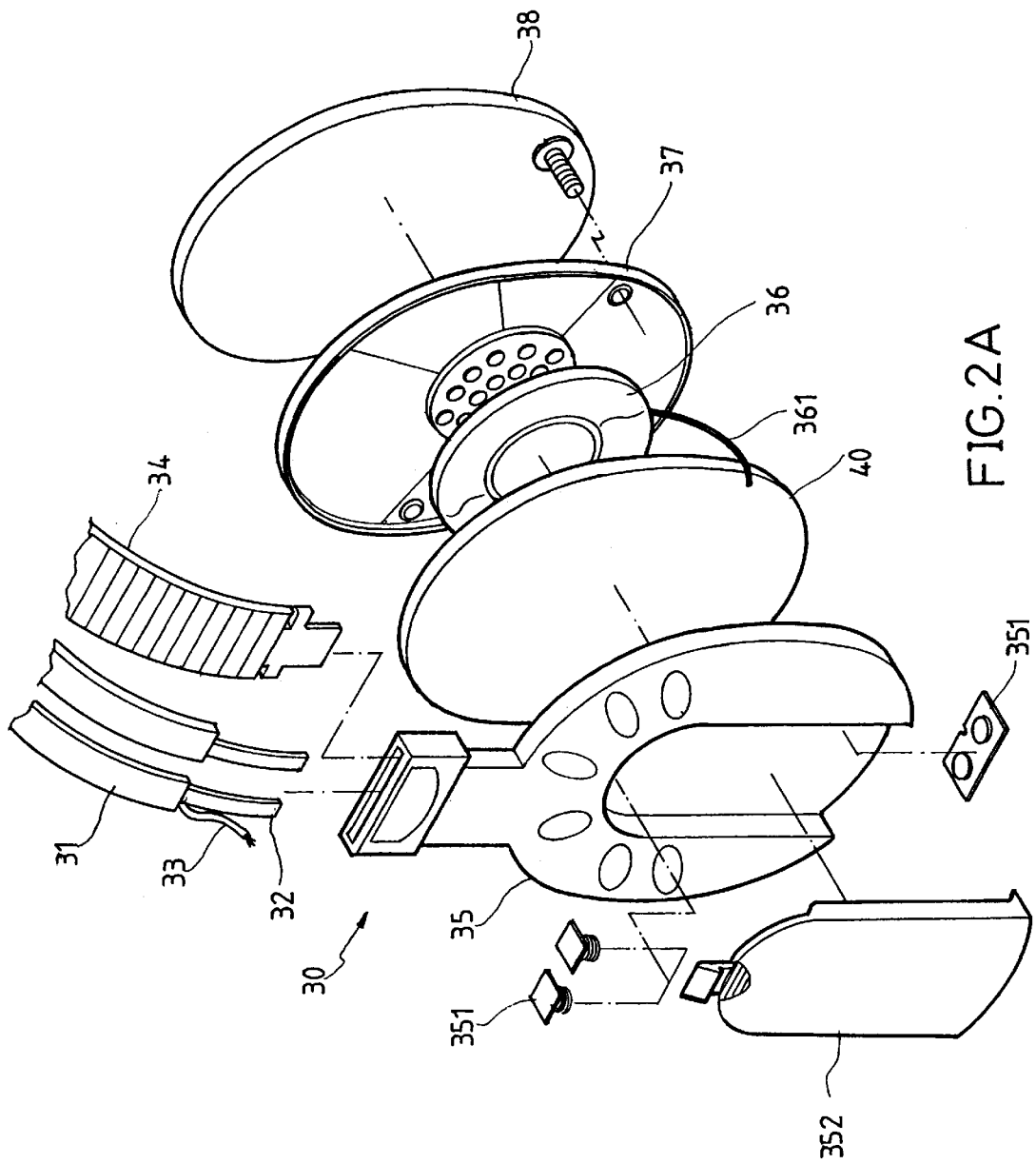
FIG. 2A is an exploded view of a receiver according to the present invention.

Referring to FIGS. 2A and 2B, a receiver 30 comprises a head band 34, two earphones coupled to two opposite ends of the head band 34, a head tube 31 supported on the head band 34, a supporting wire rod 32 and a lead wire 33 mounted in the head tube 31 and connected between the earphones. Each earphone comprises an earphone housing 35 connected to one end of the head band 34 and the head tube 31, a printed circuit board 40 connected to one end of the lead wire 33, a speaker 36 supported on the printed circuit board 40 and electrically connected to the printed circuit board 40 by an electrical wire 361, a speaker cover 37 covered on the printed circuit board 40 over the speaker 36, and an ear cushion 38 fastened to the speaker cover 37 on the outside. One of the earphone housing 35 is mounted with battery terminal connectors 351 for connecting two opposite terminals of a battery set to the corresponding printed circuit board 40, and a battery lid 352 covered over the battery terminal connectors 351 and the installed battery set.

Figure 4:
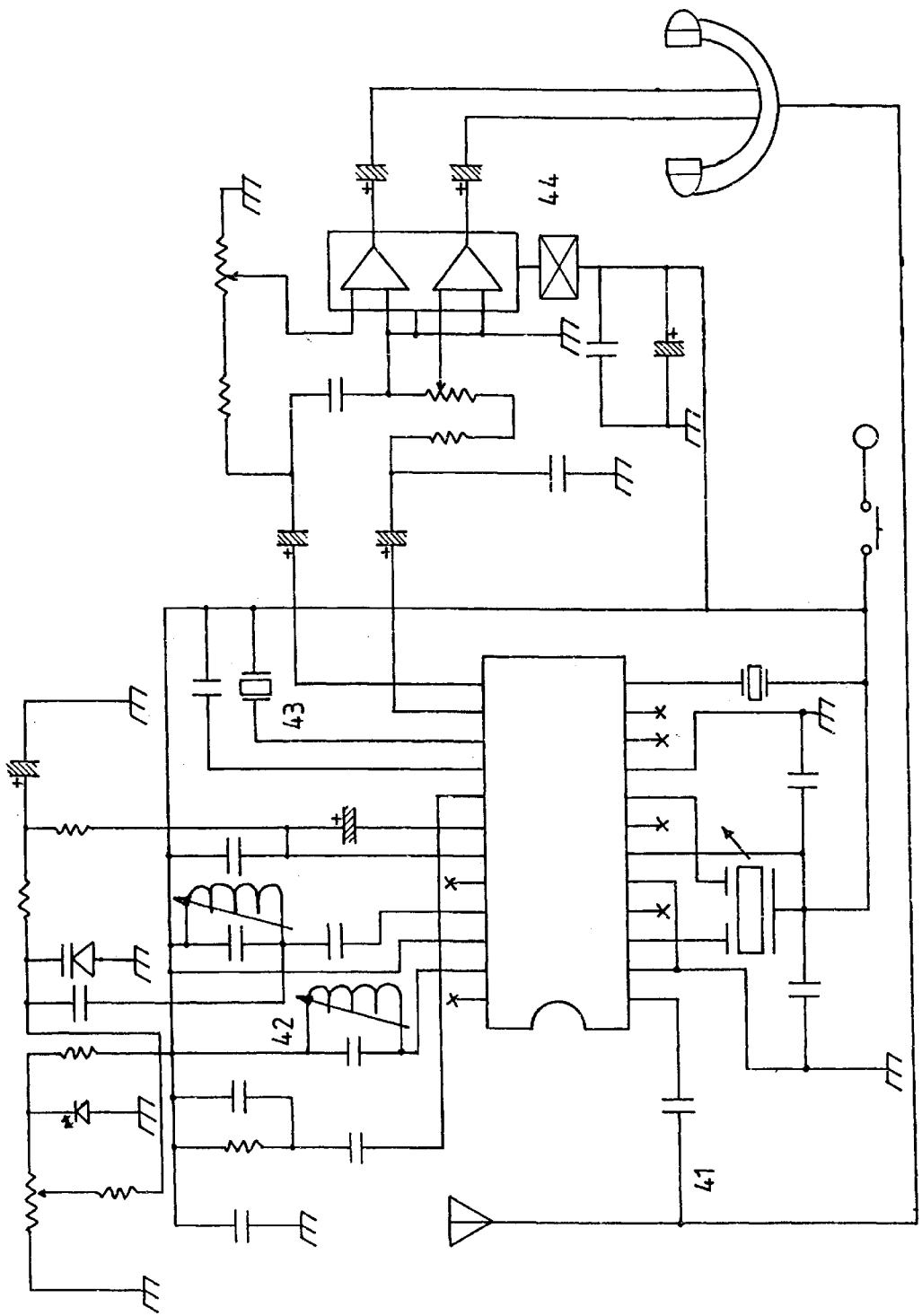
FIG. 4 is a circuit diagram of the receiver according to the present invention.
Figure 7:
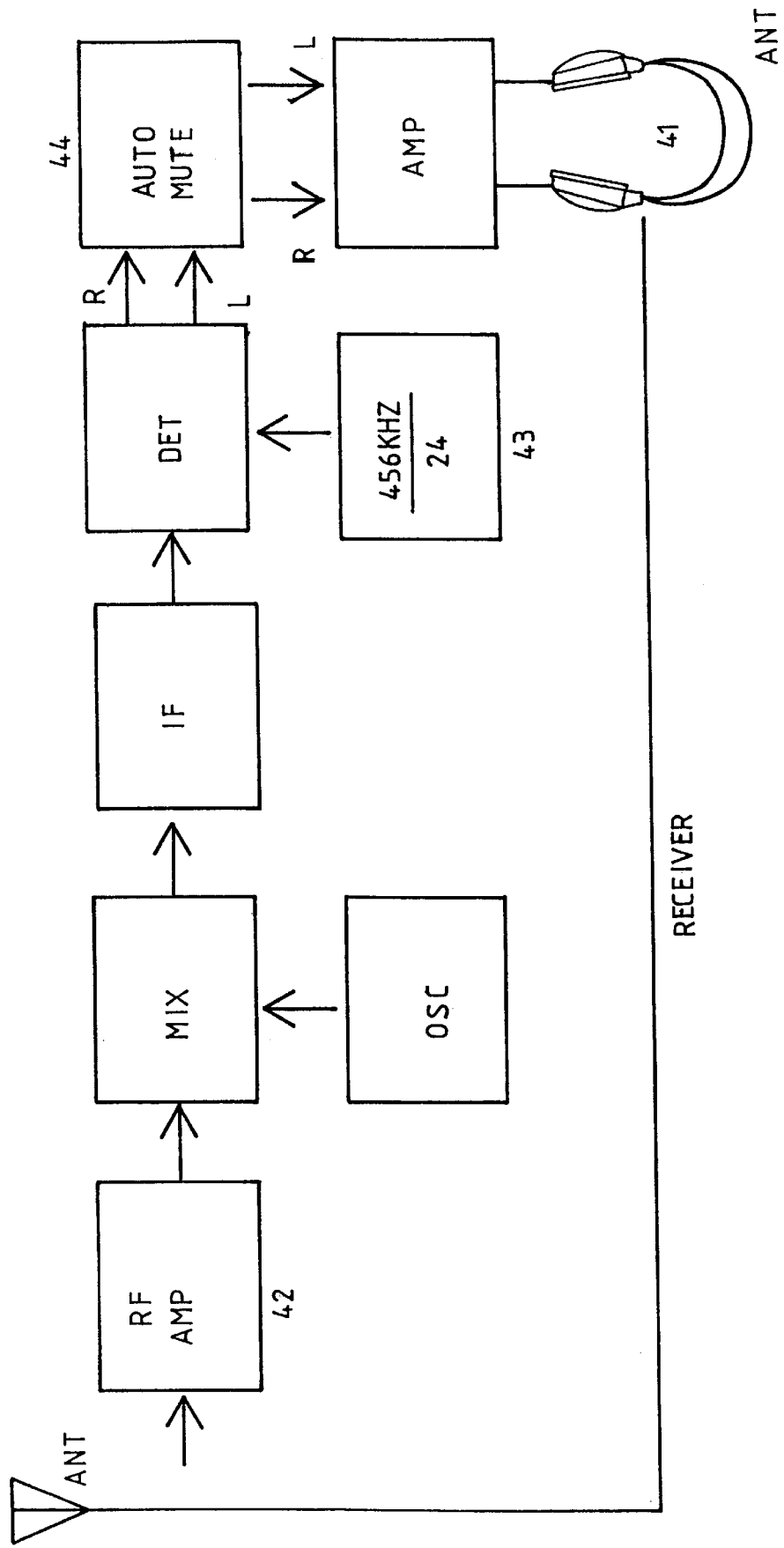
FIG. 7 is a block diagram of the printed circuit board of the receiver according to the present invention.

Referring to FIGS. 4 and 7, the printed circuit board 40 comprises a concealed receiving antenna 41, a single chip signal processing circuit 42, a 456 KHz/24 demultiplier 43, and an auto mute circuit 44. Radio signal received from the receiving antenna 41 is processed through the signal processing circuit 42, then demultiplied by the 456 KHz/24 demultiplier 43 into 19K demonulated signal, and then sent through the auto mute circuit 44 to the earphone speakers. When the receiving antenna 41 receives no signal, the auto mute circuit 44 turns off power supply.

Figure 5A:
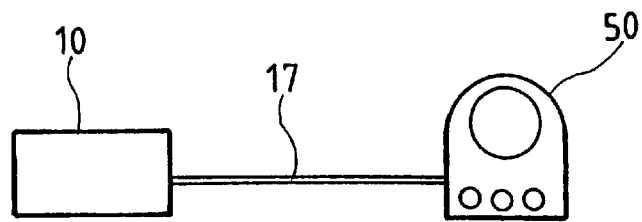
FIG. 5A is an applied view of the present invention, showing the transmitter connected to a walkman.

Referring to FIG. 5A, when the transmitter 10 and the receiver 30 are used outdoors, the transmitter 10 can be fastened to the user's clothes or the like by the clip 16, and connected to for example a walkman 50 by the 3.5Ø signal line 17. The length of the dynamic transmitting antenna, namely, the combined length of the walkman 50, the signal line 17 and the transmitter 10 is shorter than 30 centimeters. To a frequency within 35 MHz to 200 MHz, ¼ wavelength is about within 38 cm to 215 cm, i.e. the combined length of 30 cm is shorter than the ¼ wavelength, therefore the weak intensity of transmitting does not interfere with other persons of the same group using similar systems.

Figure 5B:
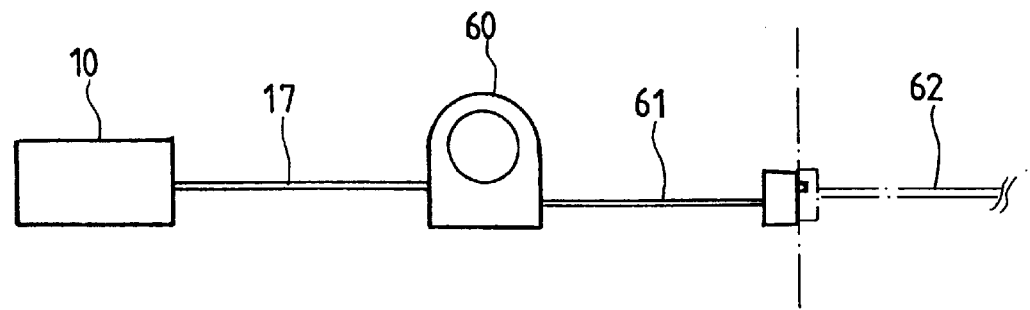
FIG. 5B is another applied view of the present invention, showing the transmitter connected to a CD player and a city power supply circuit.

Referring to FIG. 5B, when the system is used indoors, the transmitter 10 is connected to an audio equipment for example a CD player 60 by the signal line 17, and the CD player 60 is connected to city power supply circuit 62 by a cable 61. The static transmitting antenna, namely, the combined length of the signal line 17, the cable 61 and the city power supply circuit 62 is longer than 3 meters. To a frequency within 35 MHz to 200 MHz, ¼ wavelength is about 2 meters, the energy of the transmitter is approximately driven out, and the transmitting distance is greatly increased by at least 10 times. Under this mode, the intensity of transmitting power is about 10DB over the aforesaid dynamic type.

A transmitter in accordance with the present invention has a smaller size than conventional products, and can be started by using a 1.5V~3V battery. Therefore, the system is practical for use outdoors. Further, the transmitter provides two channels for selection to prevent possible interference between two similar systems within a short distance. Because the antenna of the transmitter is concealed from sight, the transmitter is convenient for carrying in one's pocket. The frequency of the system can be set within 35 MHz to 2.5 GHz, therefore mono as well as FM stereo design can be accepted. Because 456 KHz/24=19 KHz demodulated signal is used, better stereo effect is achieved.

It is to be understood that the drawings are designed for purposed of illustration only, and are not intended as a definition of the limits and scope of the invention disclosed.

What the invention disclosed is:

1. A small radio transmitter receiver system comprising:

a transmitter of size about 53 mm×29 mm×32 mm, said transmitter comprising an upper cover shell and a bottom cover shell fastened together, a transmitter printed circuit board mounted within said upper cover shell and said bottom cover shell, a plurality of switches mounted on one side of said upper cover shell and connected to said transmitter printed circuit board for switching between at least two channels, a concealed transmitting antenna mounted inside said upper cover shell and said bottom cover shell and connected to said transmitter printed circuit board for transmitting radio signal, a battery chamber disposed at a back side of said bottom cover shell, a plurality of battery terminal connectors mounted inside said battery chamber at two opposite ends and respectively connected to said transmitter printed circuit board, a battery lid covered on said battery chamber, a clip fastened to said bottom cover shell on the outside for fastening, and a 3.5Ø signal line connected to said transmitter printed circuit board and extended out of a bottom side of said bottom cover shell for connecting a signal output port of an external audio equipment to said transmitter printed circuit board, said transmitter printed circuit board comprising a single-clip signal processing circuit which is comprised of an input amplifier, a MPX (multiplex) buffer, a 38KC oscillator, a radio frequency oscillator, a radio frequency amplifier, an antenna auto power circuit;

a receiver adapted to receive radio signal transmitted from said transmitter, said receiver comprising a head band, two earphones coupled to two opposite ends of said head band, a head tube supported on said head band, a supporting wire rod and a lead wire mounted in said head tube and connected between said earphones, one of said earphones comprising an earphone housing connected to one end of said head band and said head tube, a receiver printed circuit board connected to one end of said lead wire, a speaker supported on said receiver printed circuit board and electrically connected to said receiver printed circuit board by an electrical wire, a speaker cover covered on said receiver printed circuit board over said speaker, and an ear cushion fastened to said speaker cover on the outside, said earphone housing comprising a plurality of battery terminal connectors for connecting two opposite terminals of a battery set to said receiver printed circuit board, and a battery lid covered over said battery terminal connectors, said receiver printed circuit board comprising a concealed receiving antenna, a single chip signal processing circuit, a 456 KHz/24 demultiplier, and an auto mute circuit.

\* \* \* \* \*